United States Patent [19]

Weerackody

[11] Patent Number: 5,289,499
[45] Date of Patent: Feb. 22, 1994

[54] DIVERSITY FOR DIRECT-SEQUENCE SPREAD SPECTRUM SYSTEMS

[75] Inventor: Vijitha Weerackody, Springfield, N.J.

[73] Assignee: AT&T Bell Laboratories, Murray Hill, N.J.

[21] Appl. No.: 998,229

[22] Filed: Dec. 29, 1992

[51] Int. Cl.$^5$ .................. H04B 7/216; H04B 7/06
[52] U.S. Cl. .................. 375/1; 375/100; 375/102; 370/18; 455/52.3
[58] Field of Search .................. 375/102, 100, 1; 455/52.3, 103, 276.1; 370/18

[56] References Cited

U.S. PATENT DOCUMENTS

| | | | |
|---|---|---|---|
| 3,662,268 | 5/1972 | Gans et al. | 375/102 |
| 4,001,692 | 1/1977 | Ferwick et al. | 375/102 |
| 4,694,467 | 9/1987 | Mui | 375/1 |
| 5,031,193 | 7/1991 | Atkinson et al. | 375/100 X |
| 5,065,411 | 11/1991 | Muto | 375/100 |
| 5,109,392 | 4/1992 | McDonald | 375/100 |
| 5,140,615 | 8/1992 | Jasper et al. | 375/100 |
| 5,191,598 | 3/1993 | Bäckström et al. | 375/100 |
| 5,237,586 | 8/1993 | Bottomley | 375/1 |

OTHER PUBLICATIONS

K. S. Gilhousen et al., "On the Capacity of a Cellular CDMA System," IEEE Trans. Vehicular Tech., vol. 40, No. 2, 303-312 (May 1991).
R. Price and P. E. Green, Jr., "A Communication Technique for Multipath Channels," Proc. IRE, vol. 46, 555-570 (Mar. 1958).
A. A. M. Saleh and R. A. Valenzuela, "A Statistical Model for Indoor Multipath Propagation," IEEE Journal on Selected Areas in Communications, vol. SAC-5, No. 2, 128-137 (Feb. 1987).
A. Hiroike et al., "Combined Effects of Phase Sweeping Transmitter Diversity and Channel Coding," IEEE Trans. Vehicular Tech., vol. 41, No. 2, 170-176 (May 1992).
J. T. Taylor et al., "Spread Spectrum Technology: A Solution to the Personal Communications Services Frequency Allocation Dilemma," vol. 29, No. 2, IEEE Communications Magazine, 48-51 (Feb. 1991).
Gitlin et al., "Synchronization: Carrier and Timing Recovery," Data Communications Principles, 403-32 (1992).
R. L. Pickholtz et al., "Theory of Spread-Spectrum Communications-A Tutorial," IEEE Transactions on Communications, vol. COM-30, No. 5, 855, 870-75 (May 1982).

*Primary Examiner*—Gilberto Barron, Jr.
*Attorney, Agent, or Firm*—Thomas A. Restaino

[57] ABSTRACT

An invention for providing diversity for direct sequence spread spectrum wireless communication systems is presented. The invention provides a transmitting technique for communicating a first signal comprising one or more segments to a receiver with use of a plurality of M antennas. The first signal includes one or more signal segments. The technique comprises forming M copies of the first signal; for a segment of a signal copy, weighting each of two or more sub-segments of the segment with a distinct signal, wherein a sequence of the distinct weighting signals for the segment is distinct from sequences of signals weighting the same segment of one or more other signal copies; and for each of M weighted signal copies, transmitting a signal to the receiver using a distinct antenna, the transmitted signal based on the weighted signal copy. Illustratively, the first signal is a spread spectrum signal. Moreover, the process of weighting comprises applying a phase shift to a sub-segment. The invention further provides a receiving technique which comprises, for a copy of a received signal, despreading a segment of the received signal, demodulating a plurality of sub-segments of the despread signal segment, wherein each sub-segment is demodulated with use of one or more estimated communication channel characteristics corresponding to the sub-segment, and forming a summation signal reflecting a summation of a plurality of demodulated sub-segments. The receiving technique further comprises forming a signal reflecting a signal segment value, the formed signal based on one or more summation signals. The step of demodulating may precede the step of despreading in some embodiments.

20 Claims, 4 Drawing Sheets

DIVERSITY FOR DIRECT-SEQUENCE SPREAD SPECTRUM SYSTEMS

FIELD OF THE INVENTION

The present invention relates generally to Direct Sequence Spread Spectrum wireless communication systems, such as Direct-Sequence Code Division Multiple Access systems.

BACKGROUND OF THE INVENTION

In cellular radio systems, each cell is a local geographic region containing a base station and a plurality of mobile users. Each mobile user communicates directly with a base station only; there is no direct mobile-to-mobile communication. The base station performs, among other things, a relay function allowing a mobile user to communicate with a user in another location. So, for example, the base station provides coupling of a mobile user's transmission to another mobile user in the same cell, to another base station for coupling to a mobile user in another cell, or to an ordinary public switched telephone network. In this way, a mobile user can send and receive information to and from any other addressable user.

Direct Sequence Spread Spectrum (DSSS) systems, such as Direct Sequence Code Division Multiple Access (DS-CDMA) systems, are attracting widespread attention in the personal communication fields, such as, for example, digital cellular radio. In a DS-CDMA communication system, both the time and frequency domains may be shared by all users simultaneously (this simultaneous sharing of time and frequency domains is to be distinguished from time-division and frequency-division multiple access systems, TDMA and FDMA, where multiple user communication is facilitated with use of unique time slots or frequency bands, respectively, for each user). As such, a base station may simultaneously transmit distinct information signals to separate users using a single band of frequencies. Individual information signals simultaneously transmitted may be isolated by each receiving user because of the base station's utilization of unique signature sequences in the transmission of the information signals. Prior to transmission, the base station multiplies each information signal by a signature sequence signal assigned to the user intended to receive the signal. To recover a transmitted signal from among those signals transmitted simultaneously in a frequency band, a receiving mobile user multiplies a received signal (containing all transmitted signals) by its own unique signature sequence signal and integrates the result. By so doing, the user identifies that signal intended for it, as distinct from other signals intended for other users.

In wireless communication systems (such as DS-CDMA systems), an information signal is communicated from a transmitter to a receiver via a channel comprising several independent paths. These paths are referred to as multipaths. Each multipath represents a distinct route an information signal may take in traveling between transmitter and receiver. An information signal communicated via such routs or multipaths appears at a receiver as a plurality of multipath signals, one signal for each multipath.

The amplitudes and phases of signals received from a transmitter through different multipaths of a communication channel are generally independent of each other. Because of complex addition of multipath signals, the strength of received signals may vary between very small and moderately large values. The phenomenon of received signal strength variation due to complex addition of multipath signals is known as fading. In a fading environment, points of very low signal strength, or deep fades, are separated by approximately one-half wavelength from each other.

Multipaths encountered in wireless communication systems can be described by certain characteristics, such as amplitude attenuation and phase shifting. For example, the multipaths of a DS-CDMA channel may provide different amplitude attenuations and phase shifts to an information signal communicated from a transmitter to a receiver. These different amplitude and phase characteristics may vary due to, e.g., relative movement between transmitter and receiver, or changes in local geography of the transmitter or receiver due to movement. Because of the variation of multipath characteristics, a receiver can experience a signal which fades with time. This fading is a manifestation of the complex addition of multipath signals having time varying amplitudes and phases.

If the characteristics of a DS-CDMA multipath vary slowly, a receiver experiencing a deep fade may observe a weak signal for a long period of time. Long fades are not uncommon in, e.g., indoor radio systems, where relative movement between receivers and transmitters is slow or nonexistent (often, one of these two is an immobile base station; the other is a mobile device carried by a person). Since the duration of a deep fade may be large in comparison to the duration of information symbols being communicated, long bursts of symbol errors may occur (due to the weakness of received signal strength for an extended period of time).

To avoid or mitigate the detrimental effects of fading, a technique providing diversity may be employed. Diversity refers generally to the ability of a communication system to receive information via several independently fading channels. As a general matter, diversity techniques enhance a system receiver's ability to combine or select (or both) signals arriving from these independently fading channels, thus enabling (or facilitating) the extraction of communicated information.

SUMMARY OF THE INVENTION

The present invention provides a technique for mitigating the detrimental effects of fading in DSSS systems. An illustrative transmitter embodiment of the invention provides diversity by introducing a sequence of distinct weights to segments of a signal to be transmitted. Specifically, given a signal to be transmitted which comprises signal segments reflecting binary digits, the illustrative embodiment forms M copies of the signal, where M is the number of antennas used in transmitting the signal. For each segment of each signal copy, the embodiment of the invention applies a distinct phase shift to each of M sub-segments of the segment. As a result, M phase-shifted signal copies are produced, one copy for each antenna. The sequence of distinct phase shifts applied to a given segment copy is itself distinct from the sequences of phase shifts applied to any other copy of the given segment. Each of the M phase-shifted signal copies forms the basis of a signal transmitted to a receiver with use of a distinct antenna.

An illustrative receiver embodiment comprises a plurality of receiver branches, each branch corresponding to a multipath of the communication channel through which transmitted signals have been sent. Each receiver branch performs despreading and demodulation processes. The despreading process comprises forming a product of a segment of the received signal and a signature sequence signal. Values of the despread received signal corresponding to a sub-segment are summed. The resulting sum is provided to a demodulation process which operates to remove the effects of the multipath on received signal amplitude and phase. Because of the distinct phase shifts applied by the transmitter to sub-segments of each signal segment reflecting a binary digit, the demodulation process operates on a sub-segment by sub-segment basis. The demodulated sub-segment values for each segment are summed. Summed sub-segment values from each receiver branch form the basis of a determination of the value of the binary digit corresponding the segment in question.

Illustrative embodiments of the invention provide diversity of ML'th order, where M is the number of antennas employed by the transmitter and L' is the number of receiver branches corresponding to L' multipaths. While an illustrative receiver embodiment of the invention may incorporate a multi-branch RAKE receiver (as explained below), it will be apparent to those of ordinary skill in the art that a receiver with but one branch (i.e., L'=1) may also be used. Though illustrative embodiments of the present invention concern DS-CDMA systems, the present invention is applicable to indoor and outdoor DSSS systems generally, such as DS-Carrier Sense Multiple Access systems, etc. Therefore, the invention has applicability to cellular telephony, wireless PBXs, wireless LANs, etc., and may be used in combination with other DSSS systems to enhance diversity.

DETAILED DESCRIPTION

A. Introduction

The illustrative embodiment of the present invention concerns a wireless DS-CDMA communication system such as, e.g., an indoor radio communication system, a wireless local area network, a cellular telephone system, or personal communications system. In such systems, a base station commonly uses a plurality of antennas (e.g., two) for receiving signals transmitted by one or more mobile units. This plurality of antennas provides the base station with a form of diversity known as space diversity. In accordance with the present invention, a plurality of antennas at the base station should be used for the transmission of signals to mobile units. Advantageously, the same plurality of antennas used for base station reception may be used for transmission to the mobile units. These mobile units need employ but one antenna.

1. DS-CDMA Signals

Figure 1:
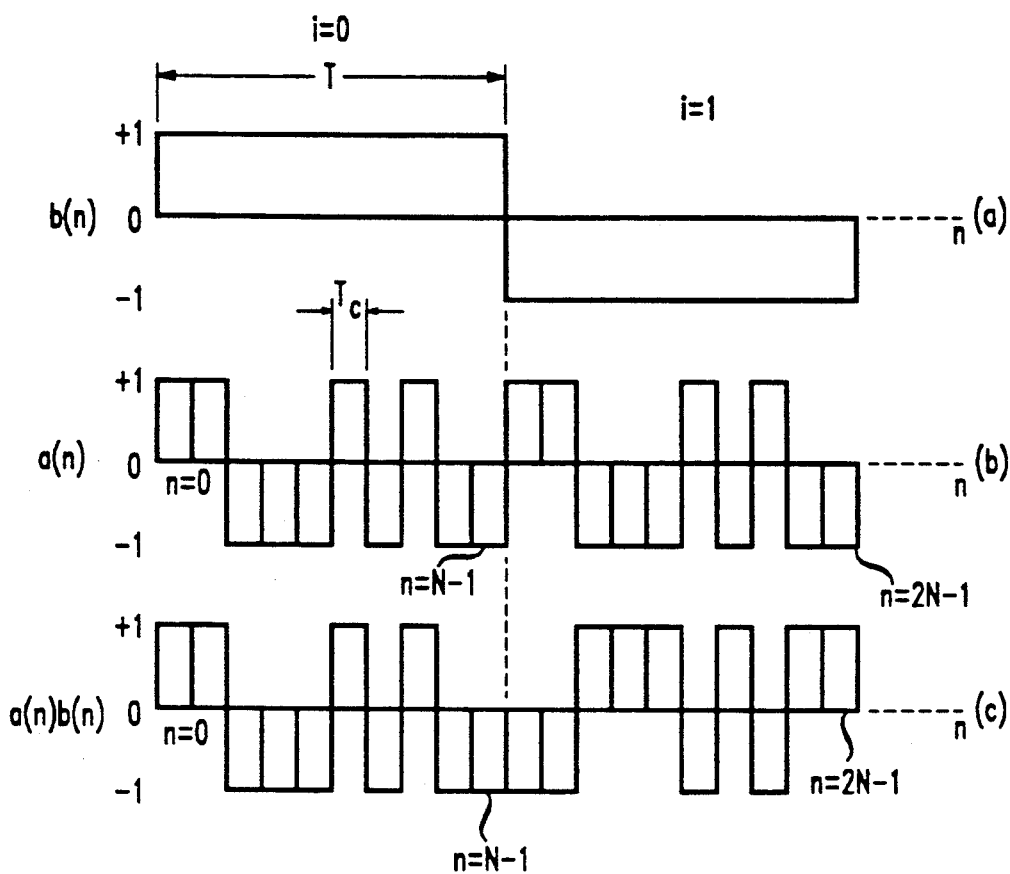
FIG. 1 presents information, signature sequence, and spread spectrum signals illustrative of DS-CDMA transmission.

FIG. 1 presents a basic set of signals illustrative of DS-CDMA transmission. Signal a(n) of FIG. 1($b$) is a signature sequence signal associated with a particular receiver, as discussed above. Signal a(n) comprises a series of rectangular pulses (or chips) of duration $T_c$ and of magnitude $\pm 1$. Discrete time variable n indexes $T_c$ intervals (i.e., n is a sampling time at the chip rate).

Signal b(n) of FIG. 1($a$) is a signal (e.g., an information signal) to be communicated to a receiver. Each bit of signal b(n) is of a duration T and is indexed by i. As shown in FIG. 1($b$), there are N chip intervals of duration $T_c$ in interval T (i.e., $N=T/T_c$).

The product of these two signals, a(n)b(n), is a spread spectrum signal presented in FIG. 1($c$). As shown in FIG. 1($c$), the first N chips of the spread spectrum signal are the same as the first N chips of signal a(n). This is because signal b(n)=1, $0 \leq n \leq N-1$. Moreover, the second N chips of the spread spectrum signal have polarity opposite to that of the second N chips of signal a(n), since signal b(n)=−1, $N \leq n \leq 2N-1$. Thus, signal b(n) modulates signal a(n) in the classic sense.

2. Fading in DS-CDMA Systems

Figure 2:
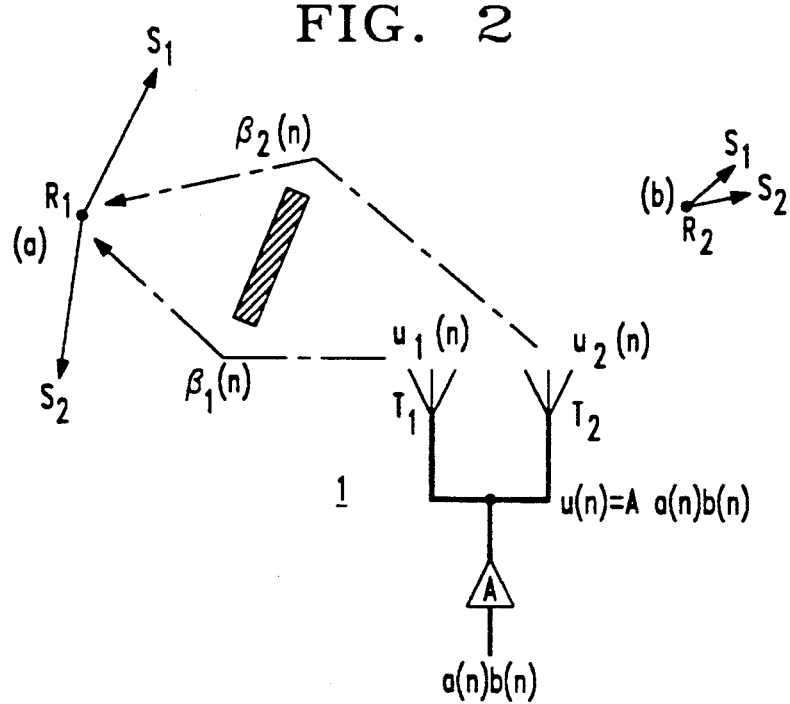
FIG. 2 presents two signal phasers from two transmitting antennas at specific points in space where deep fades occur.

FIG. 2 presents an indoor radio system comprising a base station 1 having two antennas, $T_1$ and $T_2$, for transmitting a signal through, for example, a Rayleigh fading channel to a mobile receiver (a Rayleigh fading channel is a channel without a line-of-sight path between transmitter and receiver). Each of the antennas $T_1$ and $T_2$ transmits a spread spectrum signal, u(n), which reflects a scaled product of signals a(n) and b(n) shown in FIG. 1($c$). Each copy of signal u(n) experiences an independent change in amplitude and phase due to the multipath in which it travels. This change in amplitude and phase to the transmitted signal is expressed as a complex fading coefficient, $\beta_l(n)$, where l, $1 \leq l \leq L$ identifies the multipath (in FIG. 2, L=2).

The signal received by receiver $R_1$, s(n), reflects a summation of the transmitted signals $$s(n) = \sum_{l=1}^{L} A\beta_l a(n - \tau_l)b(n - \tau_l) + v(n) \quad (1)$$

where A is a transmitter gain factor, $\tau_l$ is a transmission delay associated with a particular multipath, and v(n) is Gaussian noise added by the channel. Signal s(n) therefore comprises a summation of received signal phasors $S_l$, where $S_l = A\beta_l a(n-\tau_l)b(n-\tau_l)$.

In the example of FIG. 2, signals $S_1$ and $S_2$, are received at specific points in space where a deep fade occurs. The deep fade is due to a destructive interference of $S_1$ and $S_2$. Signals $S_1$ and $S_2$ are independently and identically distributed with, e.g., Rayleigh amplitude and uniform phase. The complex fading characteristics of the channel through which phasors $S_1$ and $S_2$ are communicated ($\beta_1(n)$ and $\beta_2(n)$) change slowly, so that the deep fade experienced by receiver $R_1$ of FIG. 2 is essentially static.

The deep fade shown location (b) of FIG. 2 occurs because of the weakness of received signal energy from each individual antenna $T_1$ and $T_2$. Thus, despite the fact that received signal phasors are not destructively aligned, receiver $R_2$ experiences a fade.

3. Path Diversity in Conventional DS-CDMA Systems

Among the techniques used to mitigate the effects of fading in DS-CDMA communication systems is the path diversity technique. Path diversity in DS-CDMA systems entails estimation of the delay introduced by each of one or more multipaths (in comparison with some reference, such as line-of-sight delay), and using this delay in a receiver structure to separate (or resolve) the received multipath signals. Once separated, conventional techniques may be used to select the best multipath signal (or to combine multipath signals) so as to extract the communicated information.

A receiver structure often employed to provide path diversity is the so-called RAKE receiver, well known in the art. See. e.g., R. Price and P. E. Green, Jr., *A Communication Technique for Multipath Channels*, 46 Proc. Inst. Rad. Eng. 555-70 (March 1958).

While the path diversity afforded by conventional RAKE receivers is beneficial in many instances, it may not provide a significant diversity benefit in certain circumstances, such as some indoor radio environments. This is because the range of multipath delay values in these environments is small (on the order of 200 to 300 nanoseconds) compared with the duration of a DS-CDMA chip interval (which may be, for example, 1 $\mu$s). Because of this, knowledge of delay values is insufficient to allow resolution of multipath signals. Thus path diversity is not generally available in such conventional DS-CDMA systems.

4. Introduction to the Illustrative Embodiments

The illustrative embodiments of the present invention provide diversity for a DS-CDMA systems, even in indoor radio environments.

The illustrative transmitter embodiment of the present invention introduces phase shifts $\theta_1(n)$ and $\theta_2(n)$ to signals $u_1(n)$ and $u_2(n)$ transmitted from antennas $T_1$ and $T_2$, respectively. These phase shifts are introduced for a portion of the interval T corresponding to each information signal bit. These phase shifts have the effect of repositioning signal phasors $S_1$ and $S_2$ with respect to each other. Should the signal phasors be disposed such that they add destructively, the phase shifts work to alter signal phasor angle so that the signal phasors add constructively. This constructive addition mitigates the effects of fading.

It will be understood by those of ordinary skill in the art that the relative angular position of signals $S_1$ and $S_2$ in FIG. 2 is merely illustrative of the possible relative angular positions such signals may take. However, signals $S_1$ and $S_2$, being out of phase by nearly $\pi$ radians, represent a near worst case scenario. Since the operation of the embodiment of the present invention works to mitigate worst case scenarios, less severe cases are naturally accounted for by the embodiment.

Figure 3:
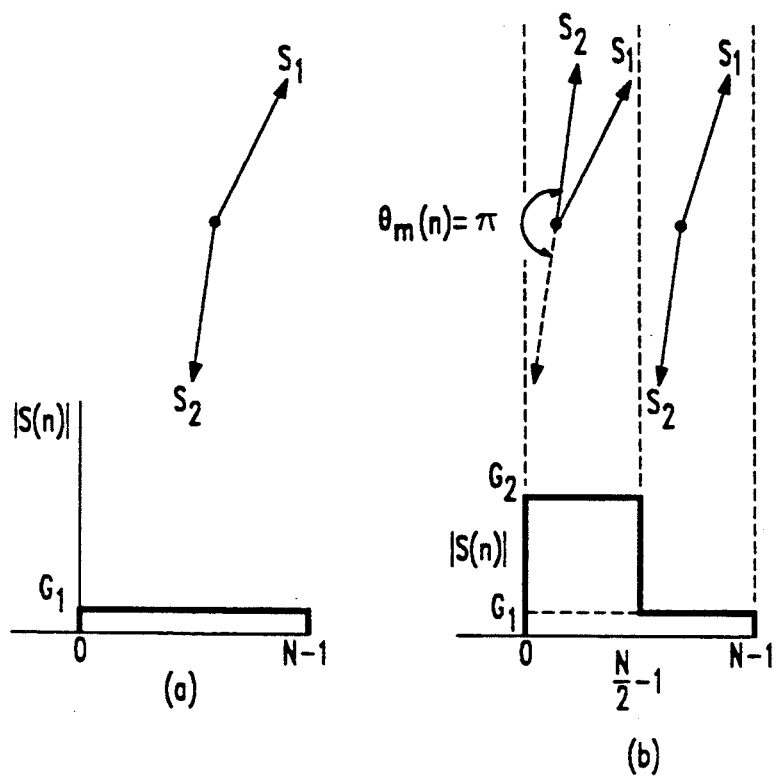
FIGS. 3($a$) and ($b$) present diagrams relating to received signal magnitude without and with, respectively, the operation of an embodiment the invention.

The operation of the illustrative transmitter embodiment may be further understood with reference to FIGS. 3(a) and (b). FIG. 3(a) presents signals $S_1$ and $S_2$ as they appear in FIG. 2. As a consequence of the static angular orientation of these signals, the resultant sum of these phasors, $s(n)$, has a magnitude, $|s(n)| = G_1$, which is small compared with the magnitude of the individual signals. Magnitude $G_1$ is indicative of a deep fade. Assuming no changes in these signals, a given information bit, such as bit $b(n)$, $0 \leq n \leq N-1$ (and likely many more), would not likely be received.

In FIG. 3(b), a phase shift of $\pi$ radians has been applied by the transmitter 1 to signal $u_2$ during the first half of the bit interval (i.e., $0 \leq n \leq N/2 - 1$) in accordance with the invention. This phase shift has the effect of changing the relative angular disposition of $S_1$ and $S_2$ such that the destructive interference experienced by receiver $R_1$ becomes constructive. As shown in the Figure, the magnitude of the sum of the phasors, $|s(n)|$ is $G_2$ for the first half of the interval and $G_1$ for the second half of the interval. The large magnitude $G_2$ for a portion (or time segment) of the bit interval enables the bit to be received by receiver $R_1$.

The illustrative transmitter embodiment may be extended to deal with the deep fades shown at location (b) of FIG. 2. All that is required is the use of additional transmitting antennas to help contribute to received signal strength. A discussion of the embodiment below is generic to the number of transmitting antennas, M.

5. Embodiment Hardware

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 5 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

B. An Illustrative Transmitter Embodiment

Figure 4:
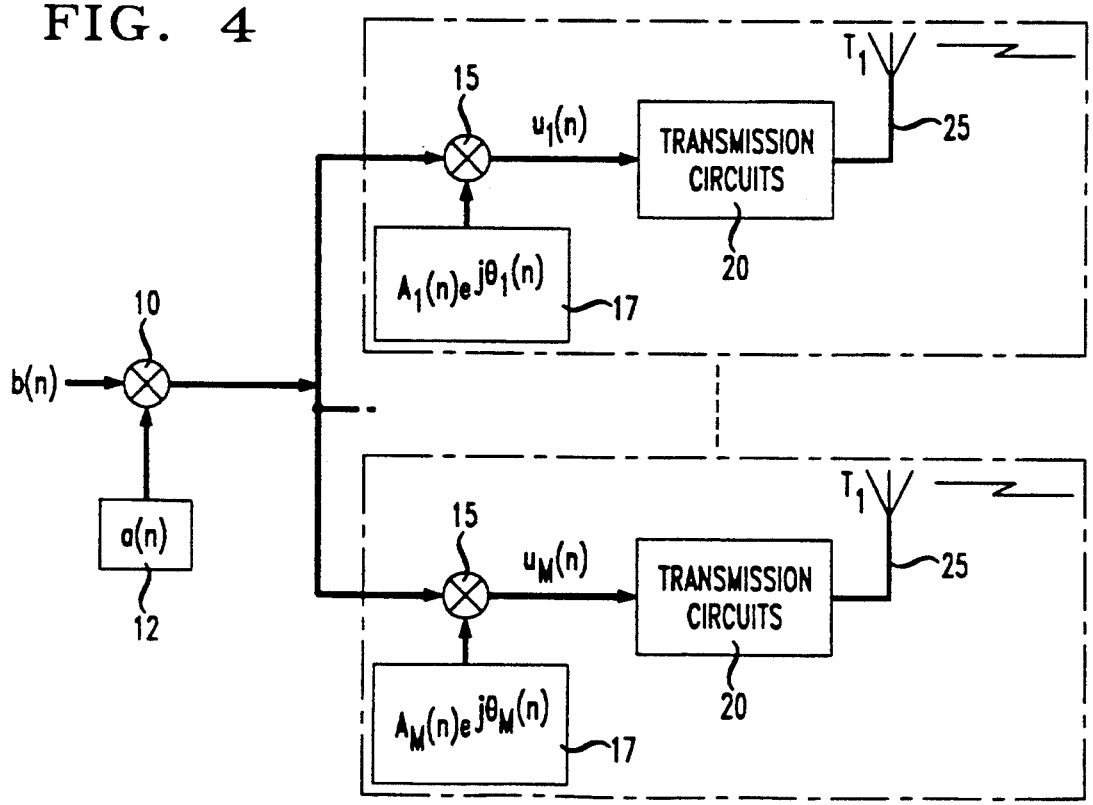
FIG. 4 presents an illustrative DS-CDMA transmitter in accordance with the invention.

FIG. 4 presents an illustrative transmitter embodiment in accordance with the present invention. The transmitter receives a signal, $b(n)$, for transmission to a receiver. Signal $b(n)$ is "spread" in the conventional sense of DS-CDMA systems by multiplying the signal by a signature sequence, $a(n)$, provided by signal generator 12. This multiplication is performed by multiplier circuit 10. The result of this multiplication is a spread spectrum signal reflecting the product $a(n)b(n)$. This spread spectrum signal is provided in parallel to a plurality of M transmitter circuit antenna branches. Each such antenna branch comprises a multiplier circuit 15, a signal generator 17, conventional transmission circuitry 20, and an antenna 25.

The multiplier circuit 15 of each antenna branch applies to the spread spectrum signal (or weighs the spread spectrum signal by) a distinct time-varying signal $p_m(n)$ of the form $$p_m(n) = A_m(n)e^{j\theta_m(n)}, \qquad (2)$$

where m indexes the antenna branch, $A_m(n)$ is signal amplitude, and $\theta_m(n)$ is signal phase. Signal $p_m(n)$ is generated by signal generator 17. Amplitude $A_m(n)$ of signal $p_m(n)$ takes the form $$A_m(n) = \frac{1}{\sqrt{M}}. \qquad (3)$$

Phase $\theta_m(n)$ of signal $p_m(n)$ takes the form $$\theta_m(n) = \frac{2\pi(m-1)m'}{M}, \qquad (4)$$

where m indexes the antenna branch; and $m' = 1, 2, \ldots$, M indexes equal temporal portions (or sub-segments) of a segment of the spread spectrum signal. Each such segment is an interval of length T and is associated with a bit of b(n). The equal sub-segments are given by $$iN + (m'-1)\frac{N}{M} \leq n \leq iN + m'\frac{N}{M} - 1, \qquad (5)$$

where i indexes the bits represented by signal b(n). The illustrative embodiment therefore applies a distinct phase shift, $\theta_m(n)$ and a common gain $A_m(n)$ to each sub-segment of the spread spectrum signal associated with a bit of b(n). If N is not an integer multiple of M, the length of the sub-segments should be made as equal as possible.

The application of phase shift $\theta_m(n)$ by the operation of generator 17 and multiplier circuit 15 is illustrated with reference to FIG. 3(b). As discussed above, when M=2 a phase shift of $\pi$ radians is applied to one of two transmitted phasors during the first half (m'=1) of a bit interval. Given two transmitting antennas (i.e., M=2), the phase shift of $\pi$ radians applied to the spread spectrum signal in the second antenna branch is provided by generator 17 in accordance with expression (4). So, for example, the phase of $p_m(n)$, $\theta_m(n)$, is equal to $\theta$ when M=2, indicating the two antenna branches; m=2, indicating the second of the two branches; and m'=1, indicating the first of M=2 equal sub-segments.

Generator 17 applies phase shift $\theta_m(n)$ for sub-segments defined in terms of n by expression (5). So, for example, assuming i=0 (i.e., assuming the first bit of b(n)), and substituting M=2, m'=1, and m=2, expression (5) simplifies to $$0 \leq n \leq \frac{N}{2} - 1$$

the first half (or sub-segment) of the interval corresponding to the first bit of b(n). Thus, generator 17 provides $p_m(n)$ with phase shift $\theta_m(n) = \pi$ for the sub-segment defined by $$0 \leq n \leq \frac{N}{2} - 1.$$

Generator 17 operates in accordance with expressions (4) and (5) to apply a phase shift of zero to the spread spectrum signal in the second antenna branch during the second half (m'=2) of the interval corresponding to the first bit of b(n). This zero phase shift is shown in FIG. 3(b) by the phasor $S_2$ in its original position (shown in FIG. 3(a)). Moreover, generator 17 applies a phase shift of zero to the spread spectrum signal in the first antenna branch during both the first and second halfs (i.e., both sub-segments) of the interval corresponding to the first bit of b(n). Again, this is done in accordance with expressions (4) and (5). This zero phase shift is shown in FIG. 3(b) by phasor $S_1$ remaining in its original position (shown in FIG. 3(a)) for both halves of the bit interval.

The distinct weighting signals, $p_m(n)$, applied to each sub-segment of a bit interval (or segment) constitute a sequence of weighting signals. The sequence of weighting signals applied by one antenna branch of the embodiment for a given bit interval is distinct from the sequence of weighting signals applied in any other branch of the embodiment during the same bit interval. So, for example, the sequence of phase shifts applied by the first antenna branch of FIG. 4 for the segments of the bit interval discussed above is (0 rad., 0 rad.). This sequence is distinct from the sequence ($\pi$ rad., 0 rad.) applied by the second antenna branch for the sub-segments of the same bit interval, since the first phase shift of each sequence is not the same.

The product of spread spectrum signal a(n)b(n) and signal $A_m(n)e^{j\theta_m(n)}$ produced by multiplier circuit 15 of each antenna branch $1 \leq m \leq M$ is a signal $u_m(n)$. Each signal $u_m(n)$ is provided to conventional transmission circuitry 20. Circuitry 20 provides, inter alia, pulse-shaping, RF-modulation, and power amplification in preparation for signal transmission via antenna 25.

As a result of the operation of the illustrative transmitter embodiment, each of M antennas 25 transmits a signal to a receiver. Each such signal is based on a distinctly phase shifted version of a spread spectrum signal.

It will be understood by those of ordinary skill in the art that a transmitter embodiment in accordance with the invention may be realized with any number of antenna branches. Expressions (2)–(5) above are presented generally to allow for such extended realizations. Furthermore, it will be understood that the sequence of operations which constitute despreading, as well as the sequence of despreading and demodulation operations, is illustrative. Other sequences of such operations may be realized in accordance with the present invention.

C. An Illustrative Receiver Embodiment

Figure 5:
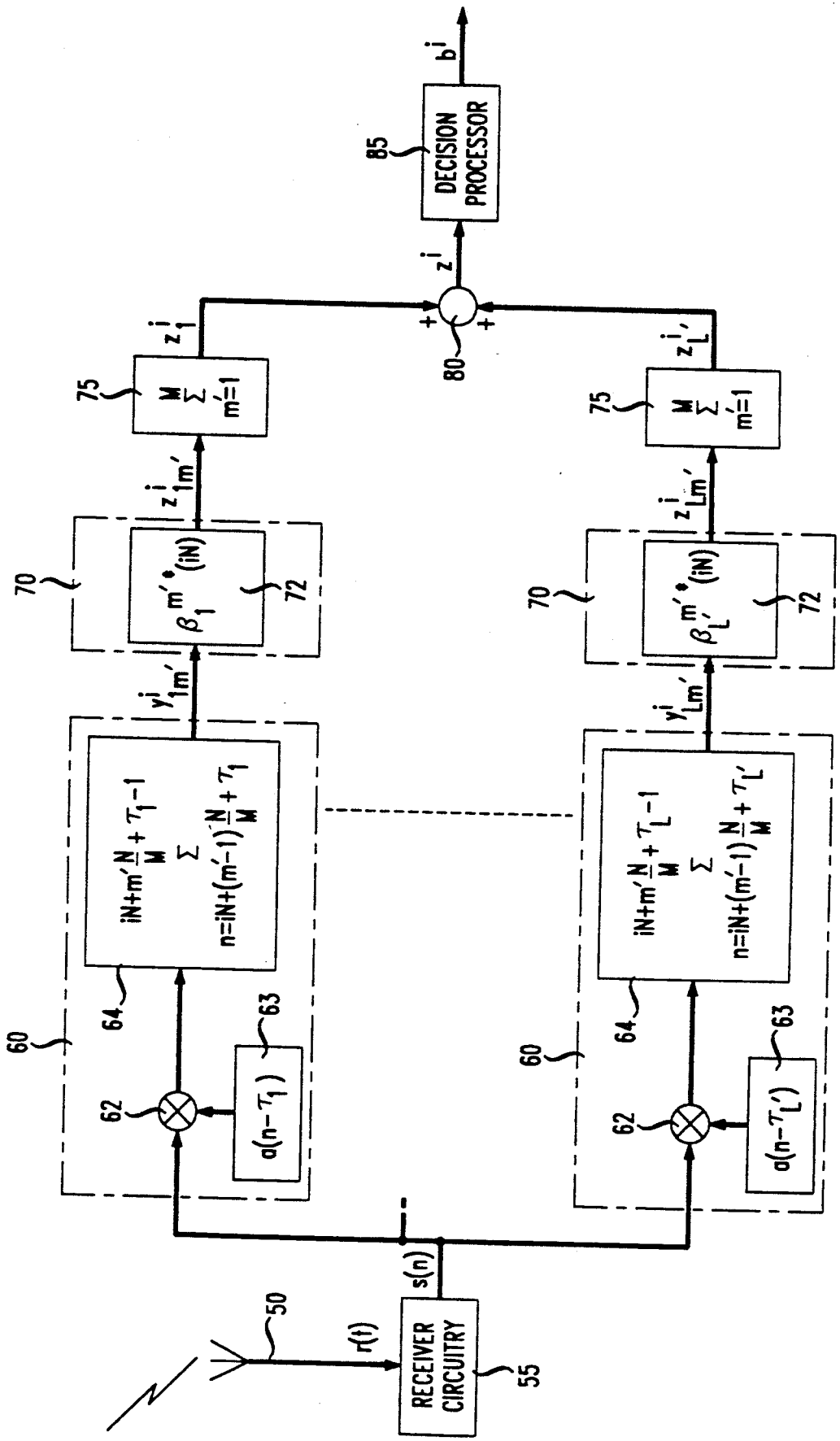
FIG. 5 presents an illustrative DS-CDMA receiver in accordance with the invention.

FIG. 5 presents an illustrative DS-CDMA RAKE receiver embodiment of the invention. The embodiment comprises an antenna 50; conventional receiver circuitry 55; L' RAKE receiver branches, where L' is less than or equal to the number of multipaths, L; summing circuit 80; and decision processor 85. The RAKE receiver branches are indexed by l, such that $1 \leq l \leq L' \leq L$. As is conventional for RAKE-type receivers, each receiver branch is "tuned" to receive signals from a particular multipath of a communication channel.

The illustrative receiver embodiment of FIG. 5 may be used to receive signals transmitted by the illustrative transmitter embodiment of FIG. 4. Assuming M=2 transmit antennas and L'=2 RAKE receiver branches, use of the illustrative transmitter and receiver in combination provides ML'th (or in this case fourth) order diversity.

Each RAKE receiver branch comprises a DS-CDMA despreader 60, a demodulator 70, and a summation memory 75. Receiver branch tuning is accomplished conventionally, by estimation of multipath transmission delay $\tau_l$ (for use by despreader 60) and the complex conjugate of the multipath complex fading coefficient, $\beta_l^*(n)$ (for use by demodulator 70). Each despreader 60 comprises multiplier circuit 62, signal generator 63, and summation processor 64. Demodulator 70 comprises demodulation processor 72.

Antenna 50 receives transmitted multipath signals from a transmitter embodiment of the invention. The received signals, r(t), are processed by conventional receiver circuitry 55 (comprising, e.g., low noise amplifiers, RF/IF band-pass filters, and a match filter) to produce signal s(n) as discussed above with reference to expression (1). Signal s(n) is provided to each of the L' receiver branches.

Multiplier circuit 62 receives signal s(n) from circuitry 55 and a delayed version of the signature sequence from signal generator 63. The signal generators 63 of the embodiment are identical but for the delay they apply to the signature sequence. Each delay, $\tau_l$, is an estimate of the transmission delay associated with the lth multipath. This delay is determined by generator 63 in the conventional fashion for DS-CDMA systems. See, e.g., Pickholtz et al., *Theory of Spread Spectrum Communications—A Tutorial*, Vol. COM-30, No. 5, IEEE Transactions on Comm. 855,870–75 (May 1982).

The output of multiplier 62 is provided to summation processor 64. For each bit of signal b(n) to be received, processor 64 forms M summations of the signal $s(n)a(n-\tau_l)$ provided by multiplier 62. Each summation is of the form $$y_{lm'}^i = \sum_{n=iN+(m'-1)\frac{N}{M}+\tau_l}^{iN+m'\frac{N}{M}+\tau_l-1} s(n)a(n-\tau_l) \quad (6)$$

where i refers to the ith bit of b(n), m' indexes equal length sub-segments of the ith bit interval, and $\tau_l$ is the conventionally determined multipath transmission delay. For each bit of b(n), processor 64 provides a despread signal segment which comprises M output signals, $y_{lm'}^i$, $1 \leq m' \leq M$.

So, for example, if M=2, processor 64 will form two summations, each of which formed over one of the two (i.e., M) equal length sub-segments of the ith bit interval indexed by m'. These summations have a form given by expression (6):

$$y_{l1}^i = \sum_{n=iN+\tau_l}^{iN+\frac{N}{2}+\tau_l-1} s(n)a(n-\tau_l) \quad (7)$$

$$y_{l2}^i = \sum_{n=iN+\frac{N}{2}+\tau_l}^{iN+N+\tau_l-1} s(n)a(n-\tau_l) \quad (8)$$

Therefore, summation processor 64 treats the sub-segments of the ith bit interval separately, since such sub-segments are subject to distinct phase shifts applied by the transmitter.

The M output signals provided by summation processor 64, $y_{lm'}^i$, for the ith bit and the lth multipath, are provided as input to demodulation processor 72. Demodulation processor 72 multiplies each signal, $y_{lm'}^i$, by an estimate of the conjugate of the complex fading coefficient for the lth multipath. In conventional RAKE receivers, the estimate of the conjugate of the complex fading coefficient for the lth multipath is determined on an incremental bit by bit basis. That is, the estimate of the conjugate of the fading coefficient for the ith bit is dependent on an estimate of the conjugate of the coefficient for the i−1th bit. However, because of the application of different phase shifts in different segments of the ith bit interval (by the transmitter), this incremental determination of the conjugate of the complex fading coefficient must be modified. This modification may be understood with reference to FIG. 6.

Figure 6:
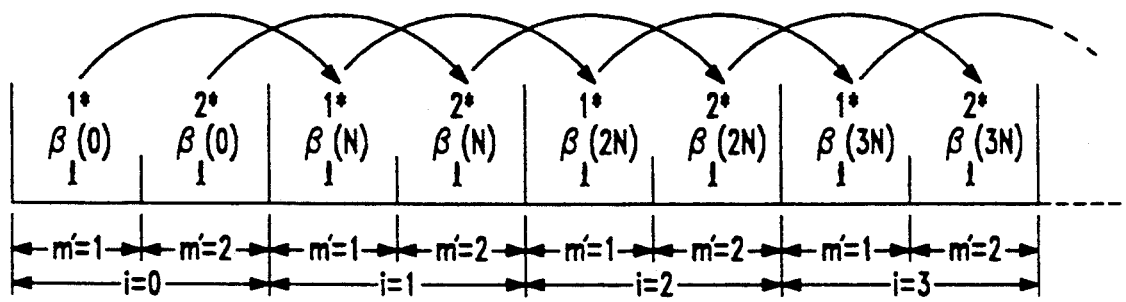
FIG. 6 presents a sequence of complex multipath characteristics for use by the illustrative receiver presented in FIG. 5.

As shown in FIG. 6, for the case where M=2, each bit, e.g., i=1, has associated with it two complex fading coefficients, $\beta^{m'*}(iN)$, $N \leq m' \leq M(=2)$. The second of these two coefficients, $\beta^{2*}(N)$, is not dependent on the coefficient which immediately precedes it, $\beta^{1*}(N)$, but rather on the second of the two fading coefficients associated with the preceding bit, $\beta^{2*}(0)$. This is because both coefficients, $\beta^{2*}(N)$ and $\beta^{2*}(0)$, correspond to a bit interval sub-segment specified by m'=2. Therefore, such coefficients reflect the same phase shift applied by the transmitter.

The dependence of coefficients is indicated in the Figure by an arrow connecting a later coefficient with an earlier coefficient. As may be seen from the Figure, a coefficient associated with a given sub-segment m' of a given bit is dependent on the coefficient of the same sub-segment of the preceding bit. Therefore, processor 72 may be realized with M conventional coefficient estimation phase-locked loops, each such loop concerned with the same sub-segment m' in successive bit intervals. See, e.g., Gitlin, et al., *Data Communications Principles*, 403–32 (1992). It should be understood that processor 72 of the illustrative receiver need estimate coefficient phase only. This is because the illustrative transmitter embodiment uses only a phase shift to differentiate the signals transmitted by the different antennas.

Referring again to FIG. 5, the output of processor 72 of the l multipath receiver branch for the ith bit comprises over time M signals of the form $$z_{lm'}^i = \beta_l^{m'*} y_{lm'}^i, \quad (9)$$

where the M signals are indexed by m'. These M signals are stored by summation memory 75 and added together as received. Memory 75 forms a sum as follows:

$$z_l^i = \sum_{m'=1}^{M} z_{lm'}^i. \quad (10)$$

Signals $z_l^i$ from the memory 75 of each receiver branch are summed by summing circuit 80. The result is a signal $z^i$ which reflects each received bit i. Signal $z^i$ is provided to a conventional decision processor 85, which assigns a binary value for each bit, $b^i$, based on $z^i$. Processor 85 illustratively provides a threshold detection such that $b^i=1$ when $z^i \geq 0$, and $b^i=0$ when $z^i<0$. Binary signal $b^i$ is thus the received bit stream.

Figure 7:
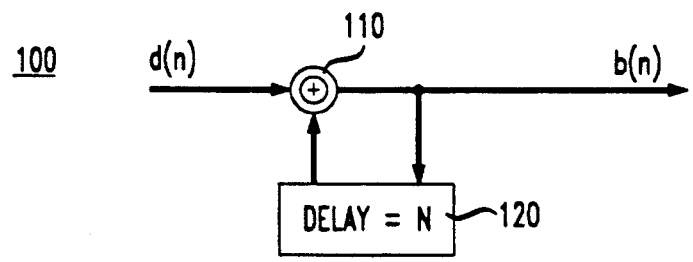
FIG. 7 presents an illustrative differential encoder for use with embodiments of the invention.

The embodiments of the transmitter and receiver presented above concern binary phase shift keying (BPSK) modulation formats. However, other modulation formats such as binary differential phase shift keying (DPSK) may be used. The transmitter embodiment presented above may be augmented to provide DPSK modulation by use of the conventional differential encoder 100 presented in FIG. 7. For DPSK modulation of a binary signal d(n), signal d(n) is presented to the conventional mod-summing circuit 110 of differential encoder 100. Modulo-2-summing circuit 110 also receives input from delay 120. The output of mod-2-summing circuit 110 is provided to the transmitter embodiment as signal b(n). Signal b(n) is also fed back to the mod-summing circuit via delay 120.

Figure 8:
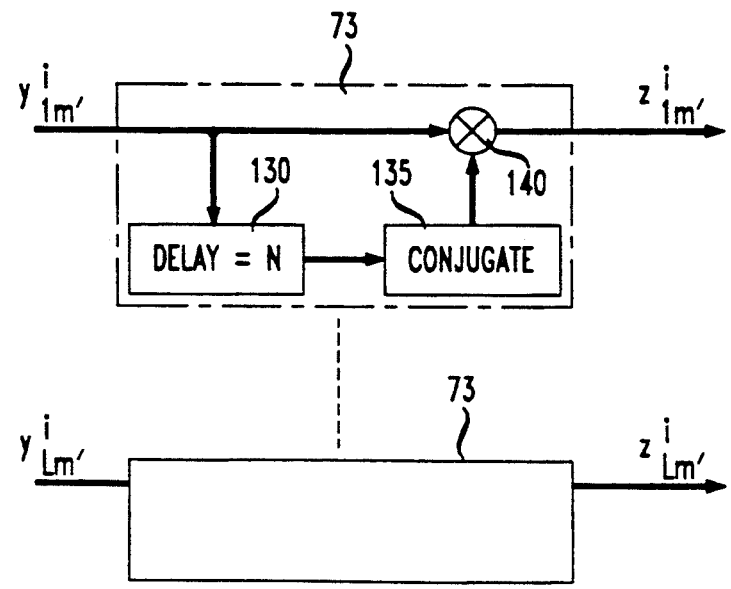
FIG. 8 presents an illustrative DPSK demodulator for use with the receiver presented in FIG. 5.

The illustrative receiver can be modified to receive DPSK modulated signals from the transmitter by replacing demodulation processors 72 discussed above with the demodulation processors 73 presented in FIG. 8. Each processor 73 is shown comprising a loop comprising delay 130, conjugate processor 135 and summing circuit 140.

The segments of signals discussed above in the context of the illustrative embodiments of the present invention concern individual binary digits (or bits) of a digital signal. It will be understood by those skilled in the art that these signal segments may reflect values of other types of signals in other embodiments of the present invention. For example, in such embodiments these segments may reflect complex-valued signals, analog signals, discrete-valued signals, etc.

I claim:

1. A method of operating a direct-sequence spread spectrum transmitter for communicating a first signal to a receiver, said transmitter including a plurality of M antennas, said first signal including one or more signal segments, the method comprising the steps of:
   a. forming M copies of said first signal;
   b. for a segment of a signal copy, weighting each of two or more sub-segments of said segment with a distinct signal, wherein a sequence of said distinct weighting signals for said segment is distinct from sequences of signals weighting the same segment of one or more other signal copies; and
   c. for each of M weighted signal copies, transmitting a signal to said receiver using a distinct antenna, said transmitted signal based on said weighted signal copy.

2. The method of claim 1 wherein the step of weighting each sub-segment with a distinct signal comprises applying a distinct phase shift to the sub-segment.

3. The method of claim 2 wherein the phase shift for an m'th sub-segment, $1 \leq m' \leq M$, of a segment of a signal copy which forms the basis for the transmitted signal from the mth antenna, $1 \leq m \leq M$, comprises $$\frac{2\pi(m-1)m'}{M}.$$

4. The method of claim 1 wherein the step of weighting each sub-segment with a distinct signal comprises applying a gain to the sub-segment, the gain comprising $$\frac{1}{\sqrt{M}}.$$

5. The method of claim 1 wherein the first signal is a spread spectrum signal which reflects a product of a second signal and a signature sequence signal.

6. The method of claim 5 wherein the second signal is a differentially encoded signal.

7. The method of claim 1 wherein a signal segment reflects a discrete signal value.

8. The method of claim 7 wherein the discrete signal value comprises a binary digit.

9. The method of claim 1 wherein the step of transmitting a signal to a receiver comprises forming a spread spectrum signal reflecting a product of the weighted signal copy and a signature sequence signal.

10. The method of claim 9 wherein the first signal is a differentially encoded signal.

11. A method of operating a direct-sequence spread spectrum receiver to determine one or more signal segment values which are represented in a received signal from a communication channel, the received signal reflecting signals transmitted with use of a plurality of antennas, the method comprising the steps of:
   1. for one or more copies of the received signal,
      a. despreading a segment of the received signal,
      b. demodulating a plurality of sub-segments of the despread signal segment, wherein each sub-segment is demodulated with use of one or more estimated communication channel characteristics corresponding to the sub-segment, and
      c. forming a summation signal reflecting a summation of a plurality of demodulated sub-segments; and
   2. forming a signal reflecting a signal segment value, said formed signal based on one or more summation signals.

12. The method of claim 11 wherein the step of despreading a segment of the received signal comprises the steps of:
   i. applying a signature sequence signal to the received signal; and
   ii. for each of a plurality of received signal sub-segments to which a signature sequence signal has been applied, forming a summation signal reflecting a summation of signal values of such sub-segment;

wherein a despread signal segment comprises a plurality of summation signals from step ii.

13. The method of claim 11 wherein the received signal is provided by receiver circuitry coupled to an antenna.

14. The method of claim 11 wherein a signal segment value comprises a discrete value.

15. The method of claim 14 wherein the discrete value comprises a binary digit.

16. A method of operating a direct sequence spread spectrum receiver to determine one or more signal segment values which are represented in a received signal from a communication channel, the received signal reflecting signals transmitted with use of a plurality of antennas, the method comprising the steps of:
   1. for one or more copies of the received signal,
      a. demodulating a plurality of sub-segments of a segment of the received signal, wherein each sub-segment is demodulated with use of one or more estimated communication channel characteristics corresponding to the sub-segment,
      b. despreading a plurality of demodulated sub-segments of the received signal, and
      c. forming a summation signal reflecting a summation of a plurality of despread sub-segments; and
   2. forming a signal reflecting a signal segment value, said formed signal based on one or more summation signals.

17. The method of claim 16 wherein the step of despreading a segment of the received signal comprises the steps of:
   i. applying a signature sequence signal to a plurality of demodulated sub-segments; and
   ii. for each of a plurality of sub-segments to which a signature sequence signal has been applied, forming a summation signal reflecting a summation of signal values of such sub-segment;

wherein a despread signal segment comprises a plurality of summation signals from step ii.

18. The method of claim 16 wherein the received signal is provided by receiver circuitry coupled to an antenna.

19. The method of claim 16 wherein a signal segment values reflect comprises a discrete value.

20. The method of claim 19 wherein the discrete value comprises a binary digit.

* * * * *